(12) United States Patent
Yamazaki (10) Patent No.: US 10,889,332 B2
(45) Date of Patent: Jan. 12, 2021

(54) STRUCTURE FOR COUPLING AN UPPER PORTION OF AN INSTRUMENT PANEL WITH A DEFROSTER

(71) Applicant: TOYOTA JIDOSHA KABUSHIKI KAISHA, Toyota (JP)

(72) Inventor: Yasunobu Yamazaki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 79 days.

(21) Appl. No.: 16/245,722

(22) Filed: Jan. 11, 2019

(65) Prior Publication Data

US 2019/0263453 A1 Aug. 29, 2019

(30) Foreign Application Priority Data

Feb. 28, 2018 (JP) ................................. 2018-034153

(51) Int. Cl.
*B62D 25/14* (2006.01)
*B60H 1/00* (2006.01)
*B60H 1/24* (2006.01)

(52) U.S. Cl.
CPC ....... *B62D 25/142* (2013.01); *B60H 1/00564* (2013.01); *B60H 1/242* (2013.01)

(58) Field of Classification Search
CPC ... B62D 25/142; B60H 1/242; B60H 1/00564
USPC .......................................................... 296/70
See application file for complete search history.

(56) References Cited

U.S. PATENT DOCUMENTS

| 8,602,479 B2* | 12/2013 | Kuwabara | B60K 37/00 |
| | | | 296/72 |
| 2004/0183331 A1* | 9/2004 | Yamazaki | B62D 25/142 |
| | | | 296/72 |
| 2006/0108824 A1 | 5/2006 | Yamazaki et al. | |

FOREIGN PATENT DOCUMENTS

| JP | H08-230621 A | 9/1996 |
| JP | 2004-203244 A | 7/2004 |
| JP | 2018-008590 A | 1/2018 |

* cited by examiner

*Primary Examiner* — Joseph D. Pape
*Assistant Examiner* — Dana D Ivey
(74) *Attorney, Agent, or Firm* — Oliff PLC (57) ABSTRACT

A connecting member includes at least one of a tilting allowing structure configured to allow tilting of the connecting member, a buckling allowing structure configured to buckle at a first portion of the connecting member and a bending deformation allowing structure configured to allow the connecting member to be bent at a second portion of the connecting member. When a force equal to or larger than a predetermined force is loaded on the connecting member, an upper portion of an instrument panel can be deformed without being resisted by the connecting member. Further, the connecting member is constructed such that the connecting member does not buckle when a force smaller than the predetermined force is loaded on the connecting member. Therefore, the upper portion of the instrument panel can be prevented from being deformed downward at a normal operating state.

15 Claims, 7 Drawing Sheets

STRUCTURE FOR COUPLING AN UPPER PORTION OF AN INSTRUMENT PANEL WITH A DEFROSTER

This application claims priority to Japanese Patent Application No. 2018-034153 filed in Japan on Feb. 28, 2018, the entire contents of which are hereby incorporated by reference.

TECHNICAL FIELD

The disclosed embodiments relate to a structure for coupling an upper portion of an instrument panel with a defroster for use in a vehicle.

BACKGROUND

Japanese Patent Publication 2004-203244 discloses a structure where a support member for supporting an upper portion of an instrument panel from a lower side of the upper portion of the instrument panel is provided at an upper wall of a defroster nozzle disposed below the instrument panel. Since the support member contacts the upper portion of the instrument panel from below, a downward deformation of the upper portion of the instrument panel can be suppressed from occurring.

However, there are the following problems with the conventional structure. Because the downward deformation of the upper portion of the instrument panel is small when a collision object (e.g., a head form in a collision test) collides with a front windshield and an impact load is imposed on the upper portion of the instrument panel in a rearward and downward direction, a deceleration (thus, an impact force) acting on the collision object becomes large. Thus, the conventional structure is required to be improved so that the collision object is better protected.

PATENT DOCUMENT

Patent Document 1: JP2004-203244

BRIEF SUMMARY

An object of the disclosed embodiments is to provide a structure for coupling an upper portion of an instrument panel with a defroster which can both suppress a deformation of an upper surface of the instrument panel and increase protection of a collision object at a time of collision of a vehicle with the collision object.

In order to achieve the above-described object, a structure for coupling an upper portion of an instrument panel with a defroster of a vehicle according to embodiments may include the following aspects:

(1) In a First Aspect, the Structure Comprises:
a defroster;
an upper portion of the instrument panel disposed above the defroster; and
a connecting member interposed between the defroster and the upper portion of the instrument panel, and coupling the upper portion of the instrument panel with the defroster.
In the structure,
(i) the connecting member includes at least one of (1) a tilting allowing structure configured to allow tilting of the connecting member relative to the defroster, (2) a buckling allowing structure configured to buckle at a first portion of the connecting member, and (3) a heading deformation allowing structure configured to allow the connecting member to be bent at a second portion of the connecting member, when a force equal to or larger than a predetermined force directed in a rearward and downward direction of the vehicle is loaded on the connecting member from the upper portion of the instrument panel, and (ii) the connecting member does not buckle at the first portion of the connecting member when a force smaller than the predetermined force and directed in the downward direction is loaded on the connecting member from the upper portion of the instrument panel, (2) In a Second Aspect In Addition to the First Aspect,
the defroster includes two clips spaced from each other in a width direction of the vehicle, the two clips defining a portion of the defroster.

The connecting member includes two flanges spaced from each other in the width direction of the vehicle.

The connecting member is coupled with the defroster at the two flanges and the two clips by tiltably engaging the twin flanges with the two clips.

The connecting member includes a lower surface including a front end and a rear end spaced from each other in a front-rear direction of the vehicle, at least one of the front end and the rear end of the lower surface of the connecting member being spaced from the defroster in an up-down direction so as to define a gap between the connecting member and the defroster including the two clips to enable tilting of the connecting member relative to the defroster. The tilting allowing structure includes the two flanges tiltably engaged with the two clips and the at least one of the front end and the rear end of the lower surface of the connecting member spaced from the defroster including the two clips.

(3) In a Third Aspect In Addition to the First Aspect or the Second Aspect, the Connecting Member Includes:
a pair of legs including first and second legs each extending in the up-down direction and having an upper end, and
an upper wall connecting the upper end of the first leg and the upper end of the second leg, of the pair of legs.

(4) In a Fourth Aspect In Addition to the Third Aspect,
a thickness and a length of each leg of the pair of legs are determined such that each leg of the pair of legs buckle when a force equal to or larger than the predetermined force is loaded on the connecting member.

The buckling allowing structure includes each leg of the pair of legs.

(5) In a fifth aspect in addition to the third aspect or the fourth aspect, the structure further comprises a defroster nozzle disposed above the defroster.

In the Fifth Aspect,
the upper portion of the instrument panel includes a main panel and a subsidiary panel disposed in front of the main panel in the front-rear direction of the vehicle, the defroster nozzle being coupled to the subsidiary panel.

The connecting member includes a sloped wall extending in a frontward and downward direction from the upper wall of the connecting member toward a position of the defroster above which the defroster nozzle is disposed, the defroster nozzle sliding on the sloped wall when the subsidiary panel coupled with the defroster nozzle is brought to a position in front of the main parcel and above the defroster during assembly.

(6) In a Sixth Aspect In Addition to the Fifth Aspect,
the sloped wall includes an upper surface and a lower surface, a notch concave in a thickness direction of the sloped wall being formed at the lower surface of the sloped wall, The bending deformation allowing structure includes the sloped wall formed with the notch.

(7) In a seventh aspect in addition to the fifth aspect or the sixth aspect, the connecting member further includes a first arm and a second arm each extending in the front-rear direction of the vehicle, the first arm connecting one of the pair of legs and the sloped wall, the second arm connecting the other of the pair of legs and the sloped wall.

(8) In an eighth aspect in addition to the third aspect, the connecting member is coupled to the upper portion of the instrument panel at the upper wall of the connecting member.

A strength-weakened portion is provided at the upper portion of the instrument panel for decoupling the upper portion of the instrument panel from the upper wall of the connecting member when the strength-weakened portion breaks, According to the above-described aspects, the technical advantages described below can be obtained.

More particularly, according to the first aspect, since the connecting member includes at least one of the tilting allowing structure, the buckling allowing structure and the bending deformation allowing structure, when a force equal to or larger than the predetermined force is loaded on the connecting member, at least one of a tilting, a buckling and a bending deformation of the connecting member occurs. Therefore, the upper portion of the instrument panel can be deformed downward without being restricted by the connecting member. As a result, a downward deformation of the upper portion of the instrument panel can be increased so that a deceleration of the collision object (e.g., the head form) can be decreased. As a result, the collision object can be better protected at a time of collision of the object with a vehicle.

Further, since the connecting member is constructed such that the connecting member is not deformed when a force smaller than the predetermined force and directed downward is loaded on the connecting member from the upper portion of the instrument panel, a downward deformation and a downward displacement of the upper portion of the instrument panel at a normal operating state, e.g., at a time of non-collision, are suppressed.

According to the second aspect, since (a) the connecting member is coupled with the defroster at the two flanges and the two clips by tiltably engaging the two flanges with the two clips, (b) the two clips are spaced from each other in a width direction of the vehicle and the two flanges are spaced from each other in the width direction of the vehicle, and (c) the at least one of the front end and the rear end of the lower surface of the connecting member is spaced from the defroster in an up-down direction so as to define a gap therebetween, the connecting member can tilt in a vertical plane extending along the front-rear direction of the vehicle about two coupling portions of the flanges with the clips of the defroster.

According to the third aspect, since the connecting member includes the pair of legs and the upper wall connecting the upper ends of the pair of legs via the upper wall, when a normal operating force smaller than the predetermined force and directed downward is loaded on the connecting member from the upper portion of the instrument panel, each of the pair of legs holds its erect posture so that the connecting member does not buckle.

According to the fourth aspect, since the thickness and the length of each of the pair of legs are determined such that the pair of legs buckle when a force equal to or larger than the predetermined force is loaded on the connecting member, the pair of legs buckle when a force equal to or larger than the predetermined force is loaded on the connecting member. At that time, the upper portion of the instrument panel can be deformed downward without being restricted in deformation by the pair of legs. Further, an energy at a time of collision can be absorbed by the buckling of the pair of legs.

According to the fifth aspect, since the connecting member includes the sloped wall extending from the upper wall toward the position of the defroster above which the defroster nozzle is disposed, when the subsidiary panel coupled with the defroster nozzle is coupled to decoupled from the main panel, the subsidiary panel coupled with the defroster nozzle can be brought to or taken out from an assembly position of the subsidiary panel with the main panel by causing the defroster nozzle to slide on the sloped wall, thereby guiding the subsidiary panel coupled with the defroster nozzle by the sloped wall and preventing the subsidiary panel coupled with the defroster nozzle from being caught by the main panel and the defroster. As a result, the subsidiary panel coupled with the defroster nozzle can be easily and smoothly brought to or taken out from the assembly position.

According to the sixth aspect, since the notch is formed at the lower surface of the sloped wall, when a force equal to or larger than the predetermined force is loaded on the connecting member, the sloped wall is bent (or broken) downward at the notch. Therefore, the upper portion of the instrument panel can be deformed downward without being restricted and resisted by the sloped wall. Further, the energy at a time of collision can be absorbed by a plastic bending deformation or a breakage of the sloped wall at the notch.

According to the seventh aspect, since the connecting member includes the first arm and the second arm connecting the sloped wall to the first and second legs of the pair of legs, respectively, when the subsidiary panel is coupled to or removed from the main panel letting the defroster nozzle slide on the sloped wall, the sloped wall can be suppressed from being deformed downward by being pushed by the defroster nozzle.

According to the eighth aspect, since the strength-weakened portion is provided at the upper portion of the instrument panel, the upper portion of the instrument panel and the connecting member can be decoupled from each other by being broken at the strength-weakened portion. As a result, the connecting member can tilt, cause buckling and be broken without being restricted by the upper portion of the instrument panel.

DETAILED DESCRIPTION OF PREFERRED EMBODIMENTS

A structure for coupling an upper portion of an instrument panel with a defroster according to an embodiment will be explained below with reference to drawings. In the drawings, "UP" shows an upward direction, and "FR" shows a front direction of a vehicle.

Figure 2:
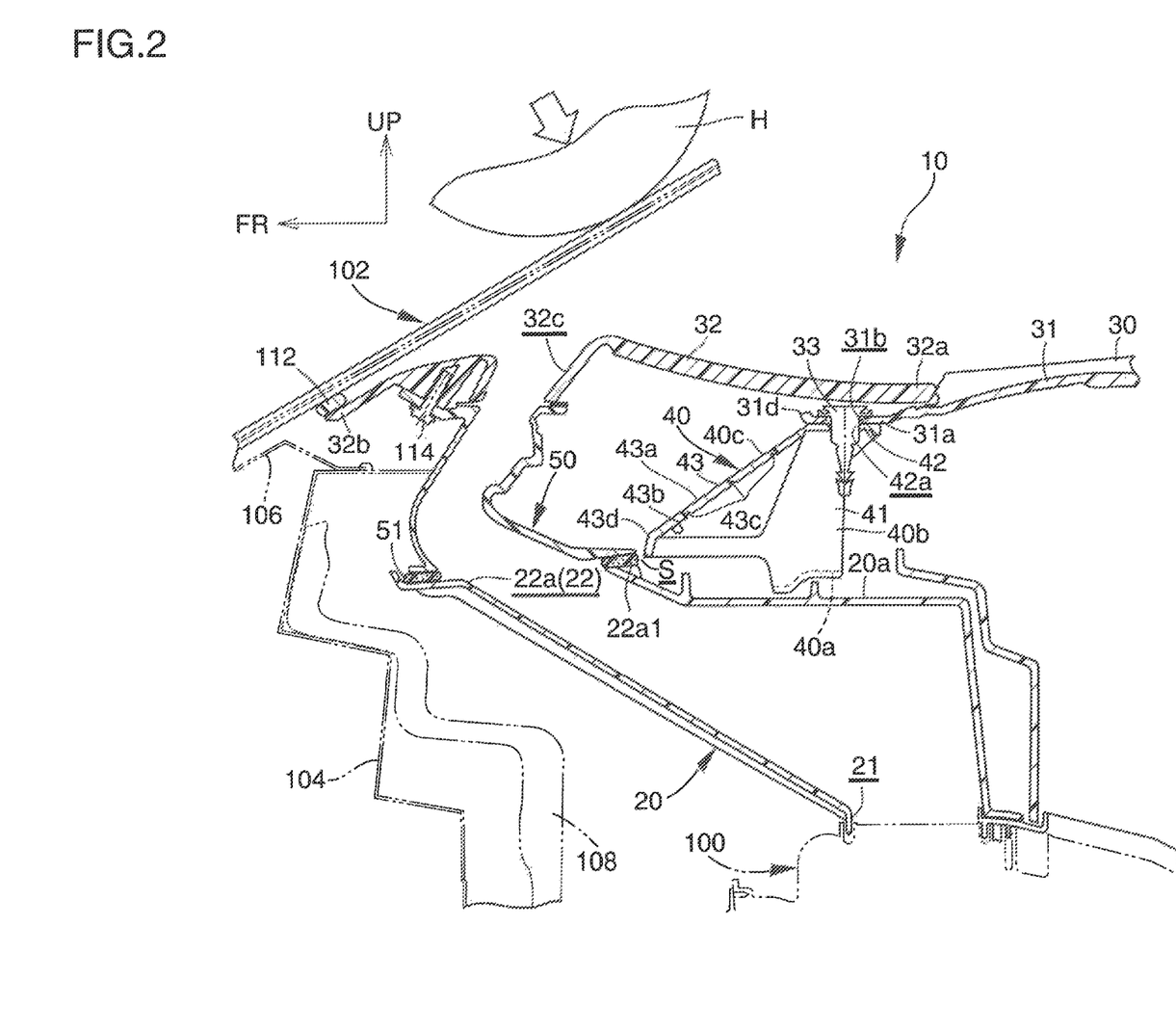
FIG. 2 is a cross-sectional view of FIG. 1 along line A-A of FIG. 1.

As illustrated in FIG. 2, the structure 10 for coupling an upper portion of an instrument panel with a defroster according to an embodiment includes a defroster 20, an upper portion of an instrument panel 30 disposed above the defroster 20, a connecting member 40 interposed between the defroster 20 and the upper portion of the instrument panel 30, the defroster 20 and the upper portion of the instrument panel 30 being connected via the connecting member 40, and a defroster nozzle 50.

Figure 3:
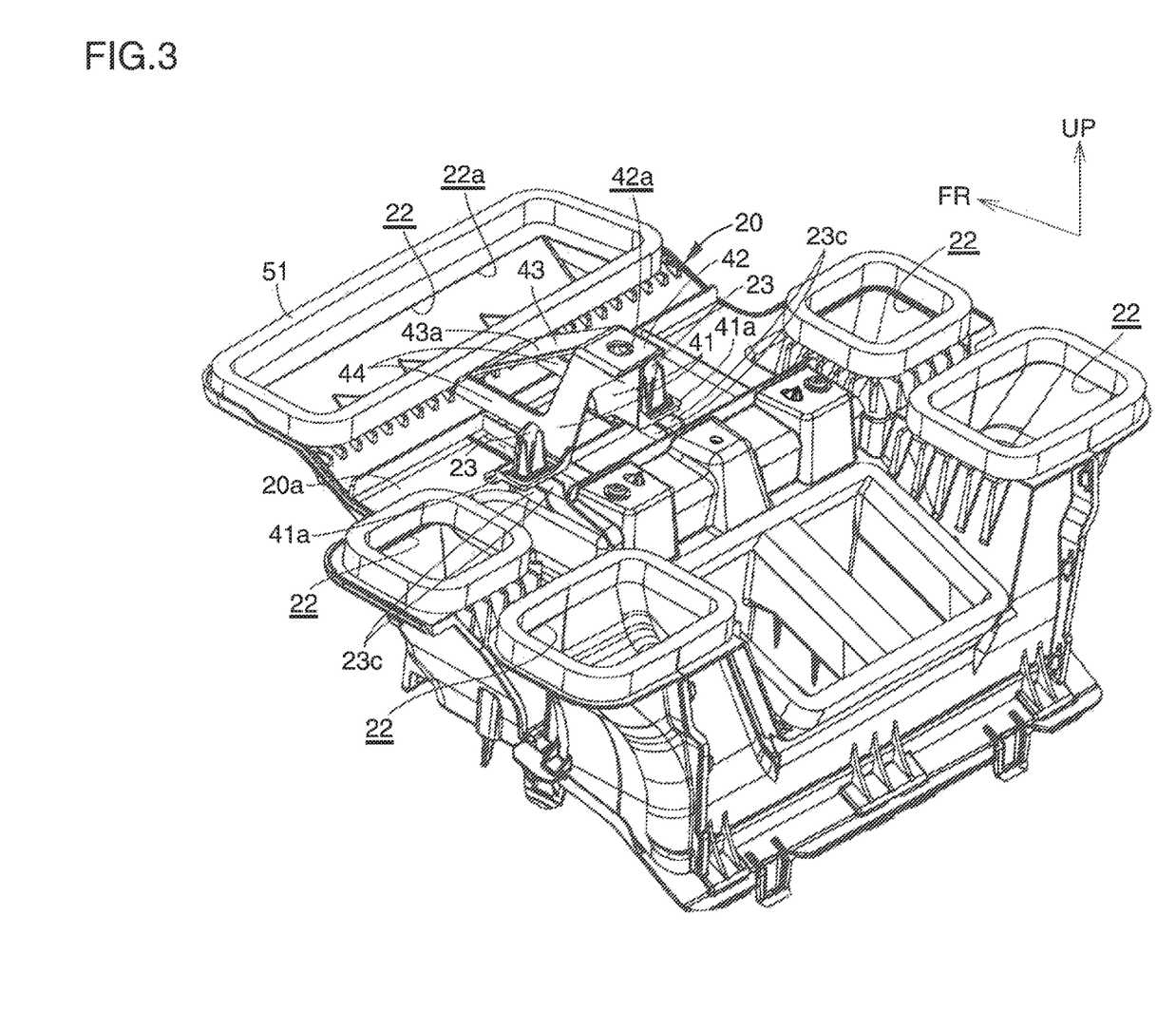
FIG. 3 is a perspective view of the defroster and a connecting member of the structure (for coupling the upper portion of an instrument panel with the defroster) according to the embodiment.

The defroster 20 is fixed to an air-conditioner unit 100. The defroster 20 is made from synthetic resin. The defroster 20 includes an air inlet 21 at a lower end portion of the defroster. Air from the air-conditioner unit 100 flows from the air inlet 21 to an interior of the defroster 20. As illustrated in FIG. 3, the defroster 20 includes an air outlet 22. A plurality of air outlets 22 is provided. The plurality of air outlets 22 includes a front air outlet 22a causing air to flow toward a front windshield 102 (shown in FIG. 2). The front air outlet 22a is provided at a portion the defroster located at a center in a width direction of a vehicle and a front end in a front-rear direction of a vehicle.

As illustrated in FIG. 2, the defroster nozzle 50 is disposed above the defroster 20. The defroster nozzle 50 is connected to the defroster 20 via a seal member 51 made from a sponge-like material. The defroster nozzle 50 is connected via the seal member to a rim portion 22a1 of the front air outlet 22a of the defroster 20. Due to this structure, the air from the front air outlet 22a flows into the defroster nozzle 50, and then flows out from the defroster nozzle 50 toward the front windshield 102 so that a frost attaching to the front windshield 102 is removed.

A dash panel 104 is provided in front of the defroster 20 in the front-rear direction of the vehicle. An upper cowl 106 is connected to an upper portion of the dash panel 104. A silencer 108 is provided between the dash panel 104 and the defroster 20 in the front-rear direction of the vehicle.

Figure 1:
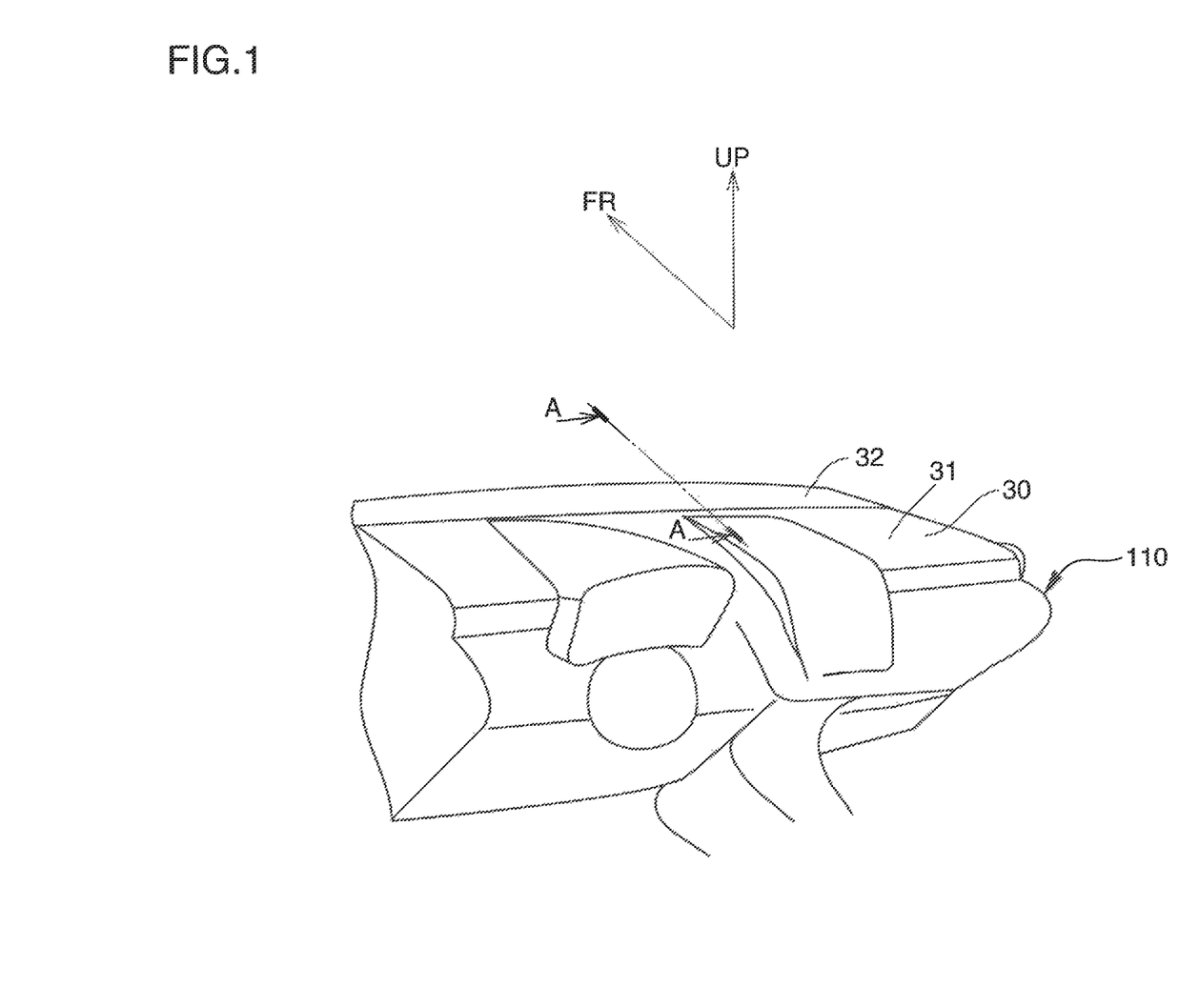
FIG. 1 is a schematic perspective view of an instrument panel of a vehicle to which a structure for coupling an upper portion of an instrument panel with a defroster according to an embodiment is applied.

As illustrated in FIG. 1, the upper portion of the instrument panel 30 defines an upper surface of the instrument panel 110 as an interior member of a vehicle. The upper portion of the instrument panel 30 is made from synthetic resin. The upper portion of the instrument panel 30 includes a main panel 31 and a subsidiary panel 32 disposed in front of the main panel 31 in the front-rear direction of a vehicle.

The subsidiary panel 32 is made separately from the main panel 31 and is assembled to the main panel 31 such that the subsidiary panel 32 can be coupled to and decupled from the main panel 31. As illustrated in FIG. 2, in the front-rear direction of the vehicle, a rear end portion 32a of the subsidiary panel 32 is disposed above a front end 31a of the main panel 31 to cover the front end 31a of the main panel 31 from an upper side of the main panel 31. A seal member 112 made from a sealant is provided at a front end 32b of the subsidiary panel 32, for sealing a space between the front end 32b of the subsidiary panel 32 and the front windshield 102.

The defroster nozzle 50 is coupled to the subsidiary panel 32. The defroster nozzle 50 may be coupled to the subsidiary panel 32 using a mechanical fixing means 114 such as a bolt and a pin or using an adhesive. The subsidiary panel 32 is coupled to or decoupled from the main panel 31 in a state where the subsidiary panel 32 has been coupled with the defroster nozzle 50. An opening 32c is provided at a portion of the subsidiary panel 32 located intermediate in the front-rear direction of the vehicle. The air having flown in the defroster nozzle 50 flows through the opening 32c and is blown to the front windshield 102.

The connecting member 40 is interposed between the front end portion 31a of the main panel 31 and an upper surface 20a of the defroster 20 in an up-down direction. The connecting member 40 is disposed on a rear side of the defroster nozzle 50 in the front-rear direction of the vehicle. The connecting member 40 is disposed at a central portion of the defroster 20 in the width direction of the vehicle. The connecting member 40 is made from synthetic resin. The connecting member 40 may be constructed in the form of a single, integral member or an assembly of a plurality of separate members.

As illustrated in FIG. 3, the connecting member 40 may include a pair of legs including first and second legs 41, two flanges including first and second flanges 41a, an upper wall 42, a sloped wall 43 and a pair of arms including first and second arms 44. The first and second legs 41 are spaced from each other in the width direction of the vehicle. The first and second flanges 41a also are spaced from each other in the width direction of the vehicle.

Figure 5:
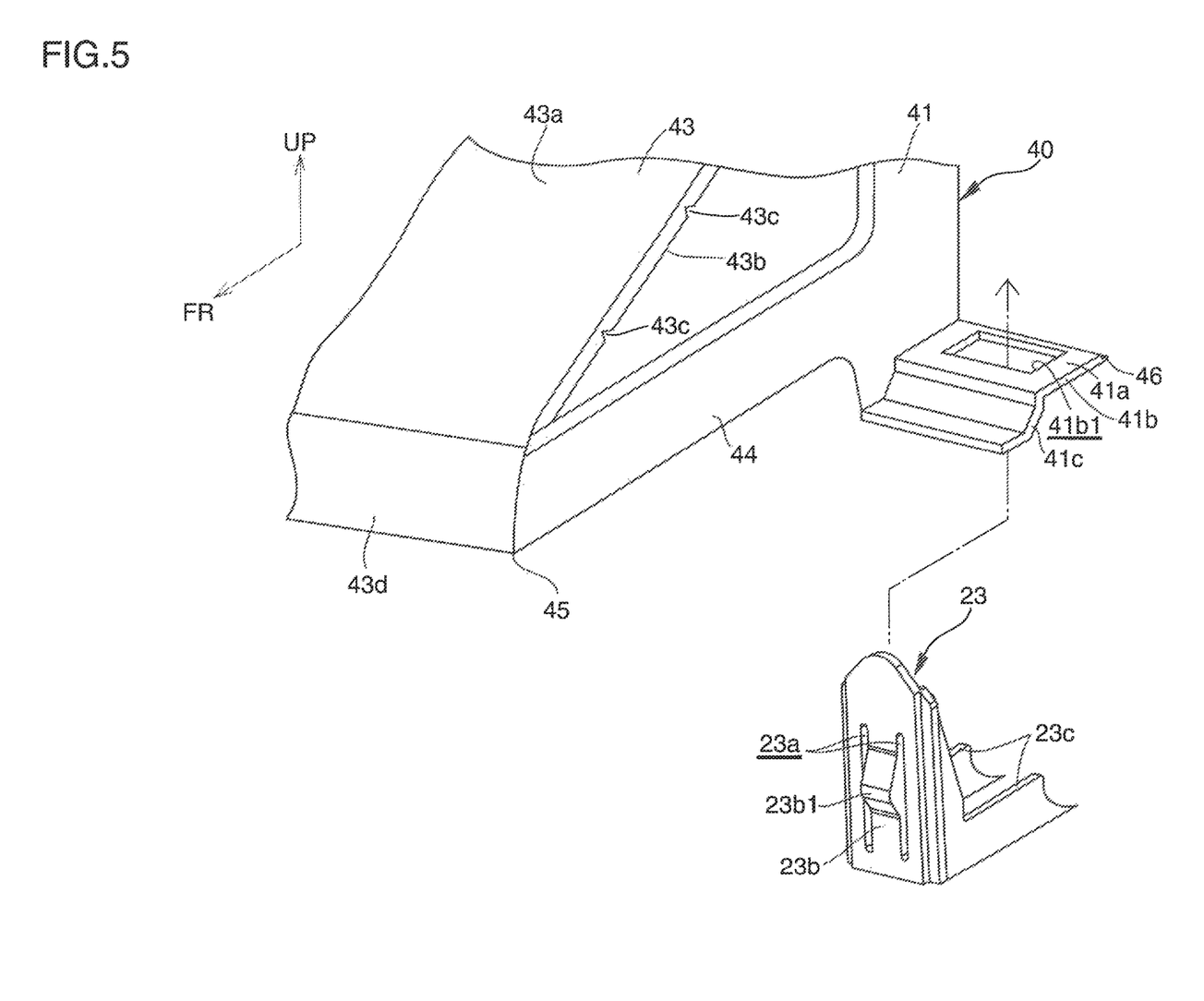
FIG. 5 is an enlarged cross-sectional view of the connecting member decoupled from the clip, of the structure according to the embodiment.

Each of the first and second legs 41 may extend in the up-down direction. Each of the first and second legs 41 may extend straight (or substantially straight) in the up-down direction. As illustrated in FIG. 5, the first and second flanges 41a are provided at lower end portions of the first and second legs 41, respectively. Each of the first and second flanges 41a includes a flat wall 41b extending horizontally and an extended wall 41c extending frontward and downward from a front end of the flat wall 41b in the front-rear direction of the vehicle and in the up-down direction.

A flange aperture 41b1 is formed at the flat wall 41b.

The defroster 20 includes two clips 23 including first and second clips 23 provided at the upper surface 20a of the defroster 20. The two clips 23 define a portion of the defroster 20. The first and second clips 23 are spaced from each other in the width direction of the vehicle. Each clip 23 is caused to penetrate the flange aperture 41b1 of each flange 41a from an under side of each flange 41a. Each clip 23 may be formed integrally with the defroster 20 or may be formed separately from the defroster 20 and fixed to the defroster 20.

Figure 6:
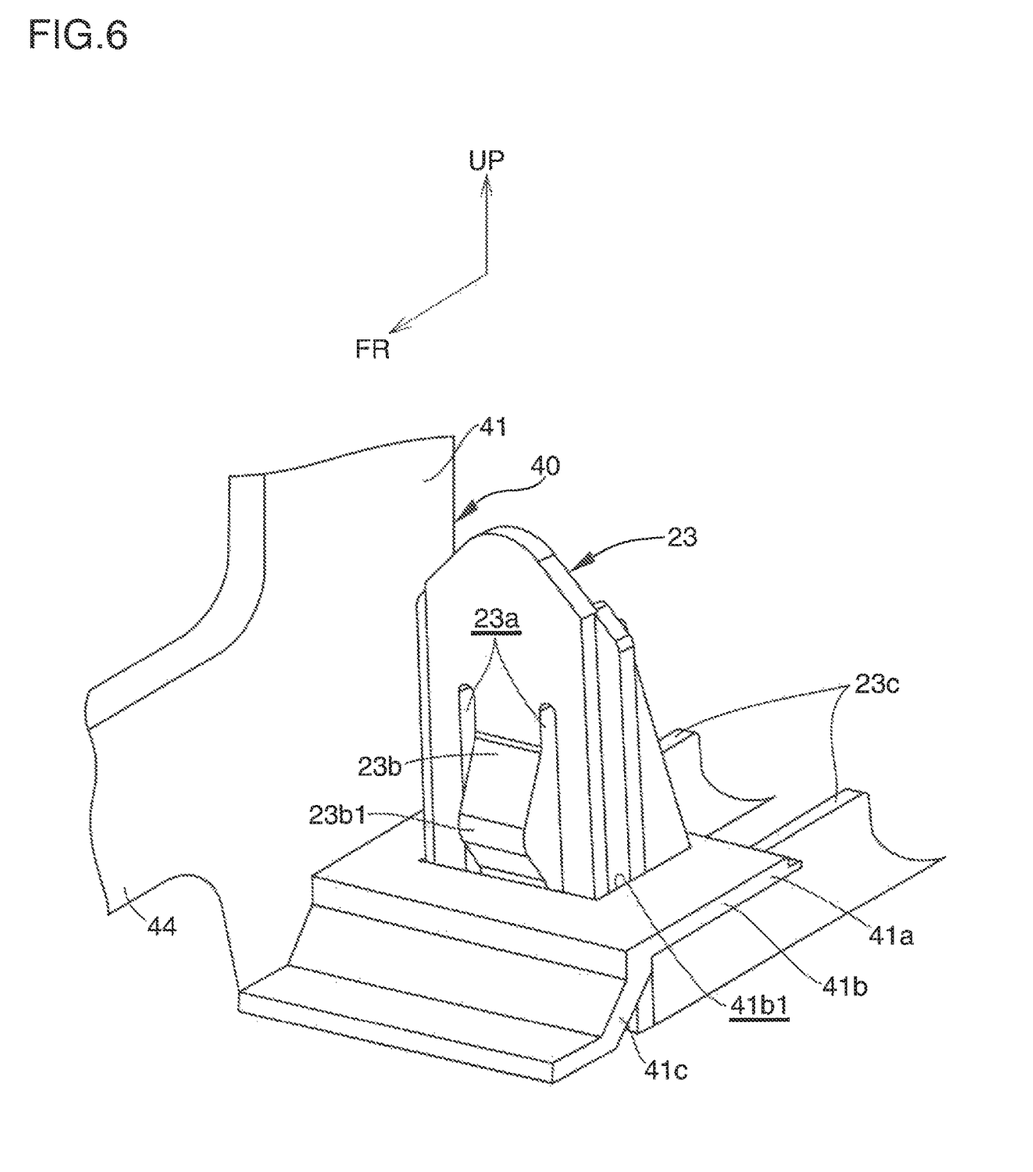
FIG. 6 is an enlarged cross-sectional view of the connecting member coupled with the clip, of the structure according to the embodiment.

Each clip 23 extends upward from the upper surface 20a of the defroster 20. Each clip 23 includes a pair of slits 23a extending in the up-down direction in parallel with each other, a deformable beam 23b defined between the slits 23a and elastically deformable in a direction perpendicular to the up-down direction due to the slits 23a, and a stopper 23c extending in the direction perpendicular to the up-down direction. At an intermediate portion of the deformable beam 23b in the up-down direction, a bulged portion 23b1 bulging in the direction perpendicular to the up-down direction is formed. When inserting the clip 23 through the flange aperture 41b1, the deformable beam 23b is elastically deformed in the direction perpendicular to the up-down direction, i.e., in the front-rear direction of the vehicle. After the bulged portion 23b1 has passed the flange aperture 41b1, the deformable beam 23b elastically returns to its original position, and as a result, the bulged portion 23b1 contacts and engages a flange aperture 41b1-defining rim of the flat wall 41b from the upper side of the flat wall 41b.

The stopper 23c contacts a lower surface of the flat wall 41b, when the bulged portion 23b1 engages the upper surface of the flat wall 41b. Since the stopper 23c is provided, the clip 23 cannot move upward (to a deeper side in an inserting direction of the clip to the flange aperture 41b1) relative to the flat wall 41b. Since the flat wall 41b is placed between the bulged portion 23b1 and the stopper 23c and is contacted by the bulged portion 23b1 and the stopper 23c, the two flanges 41a are tiltable relative to the two clips 23 so that the connecting member 40 is tiltably coupled with the defroster 20 at the two flanges 41a and the two clips The extended portion 41c of the flange 41a may extend frontward in the front-rear direction of the vehicle and downward from a front end of the flat wall 41b and may be curved or bent. A lower end of the extended portion 41c contacts the upper surface 20a of the defroster 20.

All of the two flanges 41a and the two clips 23 are located at the same position (including substantially the same position) in the front-rear direction of the vehicle so as to smoothly tilt about a single tilting axis.

The upper wall 42 connects upper ends of the first and second legs 41 via the upper wall 42. The upper wall 42 is coupled to the main panel 31. More particularly, as illustrated in FIG. 2, an upper wall aperture 42a is formed at the upper wall 42. A main panel aperture 31b is formed at the front end portion 31a of the main panel 31. The upper wall 42 is coupled to the main panel 31 by inserting a fixing means 33 such as a bolt or a pin into and through the upper wall aperture 42a and the main panel aperture 31b.

Figure 7:
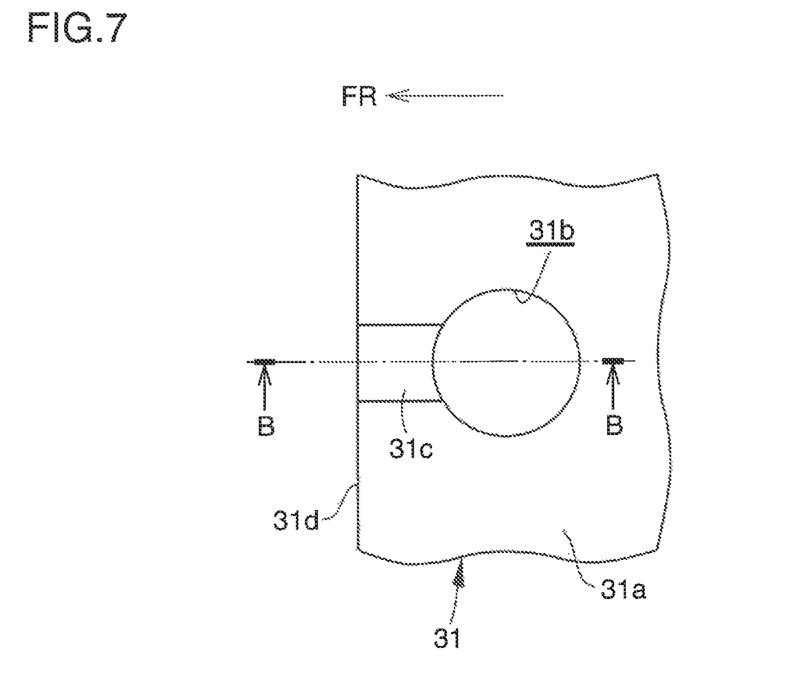
FIG. 7 is an enlarged plan view of a portion of a main panel, of the structure according to the embodiment.
Figure 8:
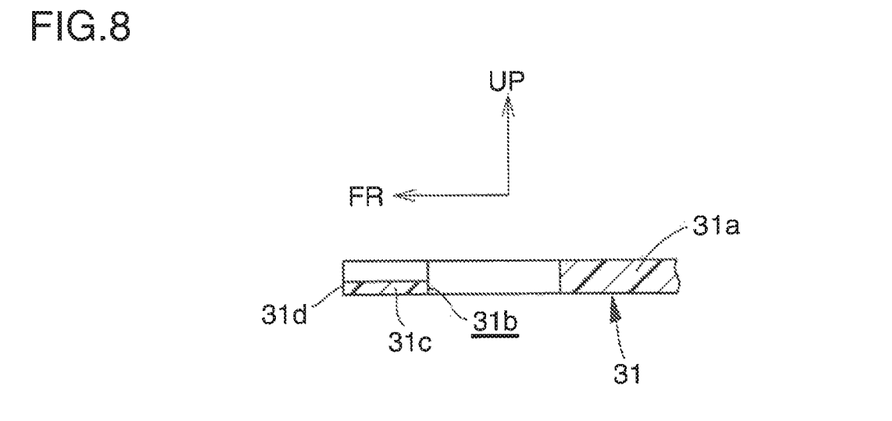
FIG. 8 is a cross-sectional view of FIG. 7 along line B-B of FIG. 7.

As illustrated in FIGS. 7 and 8, a strength-weakened portion (which may be called a breakage initiating portion) 31c is provided at the front end portion 31a of the main panel 31 of the upper portion of the instrument panel 30 for decoupling the upper portion of the instrument panel 30 from the upper wall 42 of the connecting member 40 when the strength-weakened portion 31c is broken. The strength-weakened portion 31c is provided between the main panel aperture 31b and a front end 31d of the main panel 31. The strength-weakened portion 31c (also referred to as a "weakened portion") may be provided continuously at an entire length between the main panel aperture 31b and the front end 31d of the main panel 31 in the front-rear direction of the vehicle or at only a portion of the length between the main panel aperture 31b and the front end 31d of the main panel 31 in the front-rear direction of the vehicle. The strength-weakened portion 31c is thinnest in the front end portion 31a of the main panel 31 so that the front end portion 31a of the main panel 31 is most likely to be broken. The strength-weakened portion 31c is thinner than the upper wall 42 of the connecting member 40 so that the strength-weakened portion 31c is more likely broken than the upper wall 42 of the connecting member 40.

As illustrated in FIG. 2, the sloped wall 43, which is an inclined wall, extends in a frontward and downward direction from the upper wall 42 of the connecting member 40 toward a position of the defroster 20 above which the defroster nozzle 50 is disposed, i.e., toward the rim portion 22a1 of the front air outlet 22a of the defroster 20. The sloped wall 43 includes an upper surface 43a and a lower surface 43b. The upper surface 43a and the lower surface 43b of the sloped wall 43 may be called a front surface and a rear surface, respectively. At least one notch 43e concave in a thickness direction of the sloped wall 43 is formed at the lower surface 43b of the sloped wall 43. The notch 43c extends in a direction perpendicular to an extending direction of the sloped wall 43 (i.e., the width direction of the vehicle). The notch 43c continuously extends over an entire width of the sloped wall 43 in the direction perpendicular to an extending direction of the sloped wall 43.

As illustrated in FIG. 3, the sloped wall 43 extends in the front-rear direction of the vehicle. The first arm 44 and the second arm 44 connect the first leg 41 and the second leg 41 with the sloped wall 43, respectively. When viewed from the width direction of the vehicle, the first arm 44 and the second arm 44 extend straight from lower ends or vicinities thereof of the first leg 41 and the second leg 41 toward a lower end 43d of the sloped wall 43.

Figure 4:
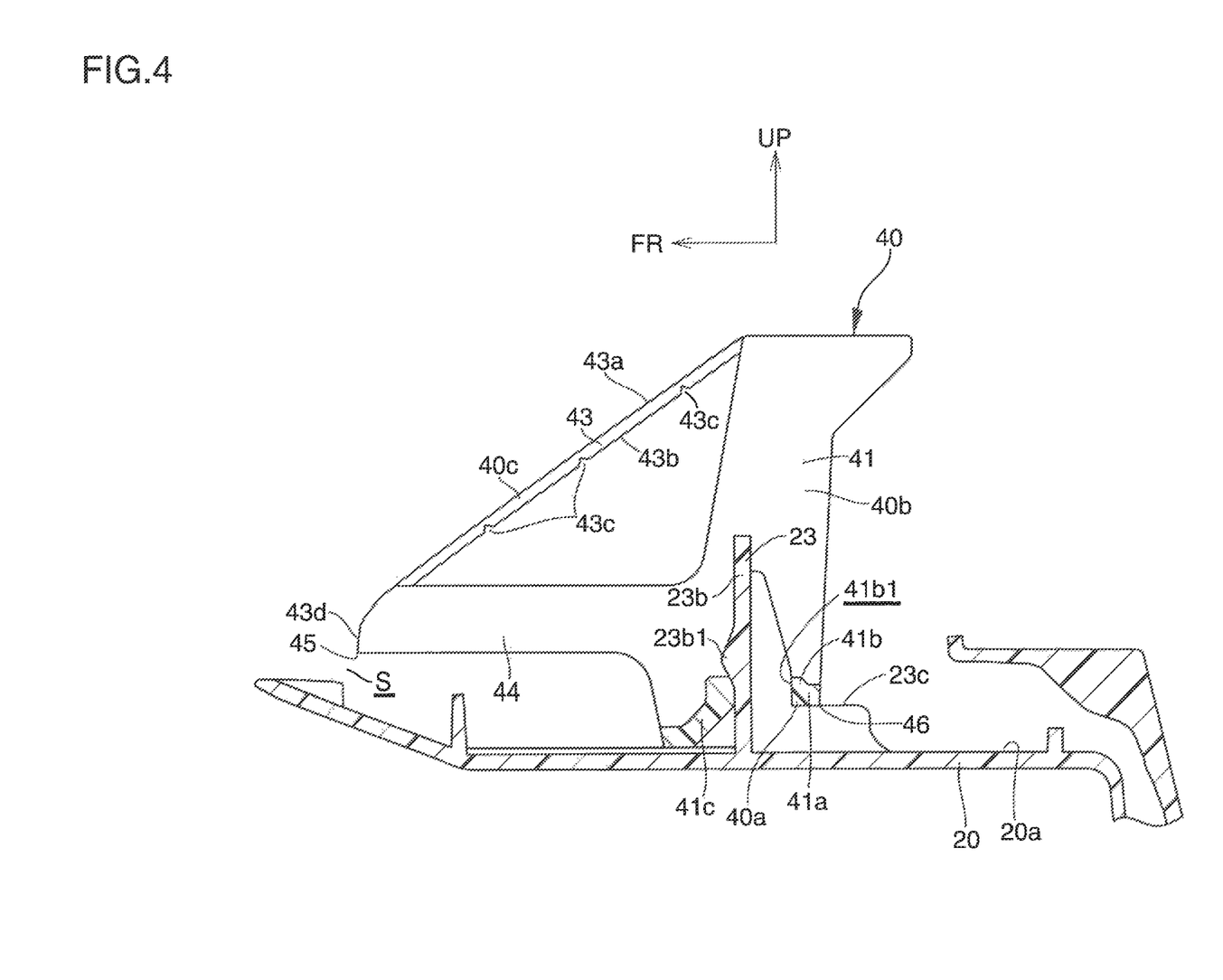
FIG. 4 is an enlarged cross-sectional view of the defroster connected with the connecting member, of the structure according to the embodiment.

As illustrated in FIG. 4, the connecting member 40 includes a lower surface including a front end 45 and a rear end 46 spaced from each other in a front-rear direction of the vehicle. At least one of the front end 45 and the rear end 46 of the lower surface of the connecting member 40 is spaced from the defroster 20 including the two clips 23 in the up-down direction so as to define a gap "S" between the defroster 20 including the two clips 23 and the at least one of the front end 45 and the rear end 46, for enabling tilting of the connecting member 40 relative to the defroster 20, i.e., for allowing the connecting member 40 to tilt relative to the defroster 20. The front end 45 of the lower surface of the connecting member 40 is defined by the front, lower end 43d of the sloped wall 43, and the rear end 46 of the lower surface of the connecting member 40 is defined by a rear end of the flange 41a. In the present embodiment, the front end 45 of the lower surface of the connecting member 40 is spaced by the gap "S" from the defroster 20 including the clip 23, while the rear end 46 of the lower surface of the connecting member 40 contacts the stopper 23c of the clip 23 (i.e., the gap "S" is not provided between the rear end 46 of the lower surface of the connecting member 40 and the defroster 20 including the clip 23).

(i) The connecting member 40 includes at least one of a tilting allowing structure 40a allowing tilting of the connecting member 40 relative to the defroster 20, a buckling allowing structure 40b allowing the connecting member 40 to buckle at a first portion (e.g., the pair of legs 41) of the connecting member 40, and a bending deformation allowing structure 40c allowing the connecting member 40 to be bent at a second portion (e.g., the sloped wall 43) of the connecting member 40, when a collision object "H" (e.g., a head form in a collision test and a head of a person in an actual collision) collides with the front windshield 102 to deform the front windshield 102 thereby imposing a load onto the upper portion of the instrument panel 30 and a force equal to or larger than a predetermined force directed in a rearward and downward direction of the vehicle is loaded on the connecting member 40 from the upper portion of the instrument panel 30.

(ii) The connecting member 40 is constructed such that the connecting member 40 does not buckle at the first portion of the connecting member 40 when a force smaller than the predetermined force and directed in a downward direction is loaded on the connecting member 40 from the upper portion of the instrument panel 30.

The "predetermined force" is smaller than a load imposed onto the connecting member 40 via the upper portion of the instrument panel 30 when the collision object "H" (the head forth) collides with the front windshield 102 at the collision test. The "predetermined force" is larger than a normal load (e.g., 3-5 kgf) which a passenger may impose onto the upper portion of the instrument panel 30 when the passenger wipes the upper portion of the instrument panel 30 at a normal time (i.e., a time of non-collision). Usually, the "predetermined force" is at a range of 10-20 kgf, though not limited to that range. The "predetermined force" may be, for example, 10 kgf.

The tilting allowing structure 40a may include the two flanges 41a tiltably engaged with the two clips 23 and the at least one of the front end 45 and the rear end 46 of the connecting member 40 spaced from the defroster 20 including the two clips 23. A tilting direction of the connecting member 40 is the front-rear direction of the vehicle. When the connecting member 40 tilts, the clip 23 may deform or break.

The buckling allowing structure 40b may include the pair of legs 41. More particularly, a thickness in the width direction of the vehicle and a length in the up-down direction, of each of the first and second legs 41 of the pair of legs 41 is determined such that each of the first and second legs 41 buckles when a force larger than the predetermined force is imposed on the connecting member 40.

The bending allowing structure 40c may include the sloped wall 43 formed with the at least one notch 43c.

Operation and technical advantages of the structure according to the present embodiment will now be explained.

When a normal load which is smaller than the predetermined force and is directed in a downward direction acts on the connecting member 40 from the upper portion of the instrument panel 30, the pair of legs 41 of the connecting member 40 would maintain its original posture, causing no deformation (or substantially no deformation).

As illustrated in FIG. 2, when the collision object "H" collides with the front windshield 102 at a time of collision test, a load which is larger than the predetermined force and is directed in the rearward and downward direction is loaded onto the connecting member 40 via the upper portion of the instrument panel 30. At that time, the strength-weakened portion 31c provided at the front end portion 31a of the main panel 31 breaks. At the same time, the connecting member 40 tilts, buckles and/or bends so that a height of the connecting, member 40 is decreased.

(A) Since the connecting member 40 includes at least one of the tilting allowing structure 40a allowing tilting of the connecting member 40 relative to the defroster 20, the buckling allowing structure 40b in which the pair of legs 41 of the connecting member 40 buckle and the bending, deformation allowing structure 40c allowing a plastic bending of the sloped wall 43 of the connecting member 40, when a force equal to or larger than the predetermined force is loaded on the connecting member 40, at least one of a tilting, a buckling and a bending deformation of the connecting member 40 occurs. Therefore, the upper portion of the instrument panel 30 can be deformed downward without being restricted in deformation by the connecting member 40. As a result, a downward deformation amount of the upper portion of the instrument panel 30 can be increased so that a deceleration acting on the collision object "H" (e.g., the head form in a collision test or a head of a person in an actual collision) can be decreased whereby a collision force acting to the collision object "H" at a time of collision can be decreased. As a result, the collision object "H" can be better protected at a time of collision of the object with a vehicle.

(B) Further, since the connecting member 40 is constructed such that the connecting member 40 is not deformed when a force smaller than the predetermined force and directed downward is loaded on the connecting member 40 from the upper portion of the instrument panel 30, a downward deformation and a downward displacement of the upper portion of the instrument panel 30 at a normal operating state, e.g., at a time of non-collision, can be suppressed.

(C) (a) The connecting member 40 is coupled with the defroster 20 at the two flanges 41a and the two clips 23 by tiltably engaging the two flanges 41a with the two clips 23. (b) The two clips 23 are spaced from each other in a width direction of the vehicle and the two flanges 41a are spaced from each other in the width direction of the vehicle thereby defining a tilting axis extending in the width direction of the vehicle between two coupling portions of the two flanges 41a with the two clips 23. (c) The at least one of the front end 45 and the rear end 46 of the lower surface of the connecting member 40 is spaced from the defroster 20 in an up-down direction so as to define a gap "S" therebetween. Owing to the above (a), (b) and (c) structures, the connecting member 40 can tilt in a vertical plane extending along the front-rear direction of the vehicle about two coupling portions of the flanges 4 1a with the clips 23 of the defroster 20, (D) Since the connecting member 40 includes the pair of legs 41 and the upper wall 42 connecting the upper ends of the pair of legs 41 via the upper wall 42, when a normal operating force smaller than the predetermined force and directed downward is loaded on the connecting member 40 from the upper portion of the instrument panel 30, each of the pair of legs 41 holds its erect posture so that the connecting member 40 does not buckle.

(E) Since the thickness and the length of each leg 41 of the pair of legs 41 are determined such that the pair of legs 41 buckle when a force equal to or larger than the predetermined force is loaded on the connecting member 40, the pair of legs 41 buckle when a force equal to or larger than the predetermined force is loaded on the connecting member 40. At that time, the upper portion of the instrument panel 30 can be deformed downward without being restricted in deformation by the pair of legs 41. Further, an energy at a time of collision can be absorbed by the buckling of the pair of legs 41.

(F) Since the connecting member 40 includes the sloped wall 43 extending from the upper wall 42 toward the position of the defroster above which the defroster nozzle 50 is disposed, when the subsidiary panel 32 coupled with the defroster nozzle 50 is coupled to or decoupled from the main panel 31, the subsidiary panel 32 coupled with the defroster nozzle 50 can be brought to or taken out from an assembly position of the subsidiary panel 32 with the main panel 31 by causing the defroster nozzle 50 to slide on the sloped wall 43, thereby guiding the subsidiary panel 32 coupled with the defroster nozzle 50 by the sloped wall 43 and preventing the subsidiary panel 32 coupled with the defroster nozzle 50 from being caught by the main panel 31 and the defroster 20. As a result, the subsidiary panel 32 coupled with the defroster nozzle 50 can be easily and smoothly brought to or taken out from the assembly position, (G) Since the notch 43c is formed at the lower surface 43b of the sloped wall 43, when a force equal to or larger than the predetermined force is loaded on the connecting member 40, the sloped wall 43 is bent (or broken) downward at the notch 43c, because the notch 43c operates as a bending-initiating point. Therefore, the upper portion of the instrument panel 30 can be deformed downward without being restricted and resisted in bending by the sloped wall 43.

Further, the energy at a time of collision can be absorbed by a plastic bending deformation or a breakage of the sloped wall 43 at the notch 43c.

(H) Since the notch 43c is formed at the lower surface 43b of the sloped wall 43, the sloped wall 43 can be more easily bent or broken than in a case where the notch were formed at the upper surface 43a of the sloped wall 43, when the sloped wall 43 receives a load from above.

(I) Since the notch 43c is formed at the lower surface 43b of the sloped wall 43, the defroster nozzle 50 can be prevented from being checked in sliding by the notch 43c, when the defroster nozzle 50 is caused to slide on the upper surface 43a of the sloped wall 43 during coupling the subsidiary panel 32 with the main panel 31 or removing the subsidiary panel 32 from the main panel 31.

(J) Since the connecting member 40 includes the first arm 44 and the second arm 44 connecting the sloped wall 43 to the first and second legs 41 of the pair of legs 41, respectively, when the subsidiary panel 32 is coupled to or removed from the main panel 31 letting the defroster nozzle 50 slide on the sloped wall 43, the sloped wall 43 can be suppressed from being deformed downward by being pushed by the defroster nozzle 50.

(K.) Since the strength-weakened portion 31b is provided at the upper portion of the instrument panel 30, the upper portion of the instrument panel 30 and the connecting member 40 can be decoupled from each other by being broken at the strength-weakened portion 31b. As a result, the connecting member 40 can tilt, buckle and be bent without being restricted or resisted by the upper portion of the instrument panel 30.

What is claimed is:

1. A structure for coupling an upper portion of an instrument panel with a defroster of a vehicle, the structure comprising:
    a defroster;
    an upper portion of the instrument panel disposed above the defroster; and
    a connecting member interposed between the defroster and the upper portion of the instrument panel, and coupling the upper portion of the instrument panel with the defroster, wherein
    (i) the connecting member is coupled with the defroster at a plurality of positions spaced from each other in a width direction of the vehicle and includes a tilting allowing structure configured to allow tilting of the connecting member relative to the defroster when a force equal to or larger than a predetermined force directed in a rearward and downward direction of the vehicle is loaded on the connecting member from the upper portion of the instrument panel, and
    (ii) the connecting member does not buckle when a force smaller than the predetermined force and directed in the downward direction is loaded on the connecting member from the upper portion of the instrument panel.

2. The structure according to claim 1, wherein
    the connecting member includes a lower surface including a front end and a rear end spaced from each other in a front-rear direction of the vehicle, at least one of the front end and the rear end of the lower surface of the connecting member being spaced from the defroster in an up-down direction so as to define a gap between the connecting member and the defroster to enable tilting of the connecting member relative to the defroster.

3. The structure according to claim 2, wherein the connecting member is coupled with the defroster with clips.

4. The structure according to claim 3, wherein the connecting member includes:
    a pair of legs including first and second legs each extending in an up-down direction and having an upper end, and
    an upper wall connecting the upper end of the first leg and the upper end of the second leg.

5. The structure according to claim 4, wherein
    the connecting member includes a buckling allowing structure configured to buckle at a first portion of the connecting member when a force equal to or larger than the predetermined force directed in the rearward and downward direction of the vehicle is loaded on the connecting member from the upper portion of the instrument panel,
    a thickness and a length of each leg of the pair of legs are determined such that each leg of the pair of legs buckles when a force equal to or larger than the predetermined force is loaded on the connecting member, and
    the buckling allowing structure includes each leg of the pair of legs.

6. The structure according to claim 4, further comprising a defroster nozzle disposed above the defroster, wherein
    the upper portion of the instrument panel includes a main panel and a subsidiary panel disposed in front of the main panel in a front-rear direction of the vehicle, the defroster nozzle being coupled to the subsidiary panel, and
    the connecting member includes a sloped wall extending in a frontward and downward direction from the upper wall of the connecting member toward a position of the defroster above which the defroster nozzle is disposed, the defroster nozzle sliding on the sloped wall when the subsidiary panel coupled with the defroster nozzle is brought to a position in front of the main panel and above the defroster during assembly.

7. The structure according to claim 6, wherein
    the connecting member includes a bending deformation allowing structure configured to allow the connecting member to be bent at a second portion of the connecting member when a force equal to or larger than the predetermined force directed in the rearward and downward direction of the vehicle is loaded on the connecting member from the upper portion of the instrument panel,
    the sloped wall includes an upper surface and a lower surface, a notch concave in a thickness direction of the sloped wall being formed at the lower surface of the sloped wall, and
    the bending deformation allowing structure includes the sloped wall formed with the notch.

8. The structure according to claim 6, wherein the connecting member further includes a first arm and a second arm each extending in the front-rear direction of the vehicle, the first arm connecting one of the pair of legs and the sloped wall, the second arm connecting the other of the pair of legs and the sloped wall.

9. The structure according to claim 4, wherein
    the connecting member is coupled to the upper portion of the instrument panel at the upper wall of the connecting member, and
    a strength-weakened portion is provided at the upper portion of the instrument panel for decoupling the upper portion of the instrument panel from the upper wall of the connecting member when the strength-weakened portion breaks.

10. A structure for coupling an upper portion of an instrument panel with a defroster of a vehicle, the structure comprising:
- a defroster;
- an upper portion of the instrument panel disposed above the defroster; and
- a connecting member interposed between the defroster and the upper portion of the instrument panel, and coupling the upper portion of the instrument panel with the defroster, wherein
    - (i) the connecting member includes at least one of (1) a tilting allowing structure configured to allow tilting of the connecting member relative to the defroster, (2) a buckling allowing structure configured to buckle at a first portion of the connecting member, and (3) a bending deformation allowing structure configured to allow the connecting member to be bent at a second portion of the connecting member, when a force equal to or larger than a predetermined force directed in a rearward and downward direction of the vehicle is loaded on the connecting member from the upper portion of the instrument panel, and
    - (ii) the connecting member: (ii-1) includes a pair of legs including first and second legs each extending in an up-down direction and having an upper end, and an upper wall connecting the upper end of the first leg and the upper end of the second leg, and (ii-2) does not buckle at the first portion of the connecting member when a force smaller than the predetermined force and directed in the downward direction is loaded on the connecting member from the upper portion of the instrument panel.

11. The structure according to claim 10, wherein
a thickness and a length of each leg of the pair of legs are determined such that each leg of the pair of legs buckles when a force equal to or larger than the predetermined force is loaded on the connecting member, and
the buckling allowing structure includes each leg of the pair of legs.

12. The structure according to claim 10, further comprising a defroster nozzle disposed above the defroster, wherein
the upper portion of the instrument panel includes a main panel and a subsidiary panel disposed in front of the main panel in a front-rear direction of the vehicle, the defroster nozzle being coupled to the subsidiary panel, and
the connecting member includes a sloped wall extending in a frontward and downward direction from the upper wall of the connecting member toward a position of the defroster above which the defroster nozzle is disposed, the defroster nozzle sliding on the sloped wall when the subsidiary panel coupled with the defroster nozzle is brought to a position in front of the main panel and above the defroster during assembly.

13. The structure according to claim 12, wherein
the sloped wall includes an upper surface and a lower surface, a notch concave in a thickness direction of the sloped wall being formed at the lower surface of the sloped wall, and
the bending deformation allowing structure includes the sloped wall formed with the notch.

14. The structure according to claim 12, wherein the connecting member further includes a first arm and a second arm each extending in the front-rear direction of the vehicle, the first arm connecting one of the pair of legs and the sloped wall, the second arm connecting the other of the pair of legs and the sloped wall.

15. The structure according to claim 10, wherein
the connecting member is coupled to the upper portion of the instrument panel at the upper wall of the connecting member, and
a strength-weakened portion is provided at the upper portion of the instrument panel for decoupling the upper portion of the instrument panel from the upper wall of the connecting member when the strength-weakened portion breaks.

\* \* \* \* \*